(12) United States Patent
Mahowald

(10) Patent No.: US 8,040,465 B2
(45) Date of Patent: Oct. 18, 2011

(54) EXTERNAL LIGHT ILLUMINATION OF DISPLAY SCREENS

(75) Inventor: Peter H. Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 12/234,561

(22) Filed: Sep. 19, 2008

(65) Prior Publication Data
US 2010/0073791 A1 Mar. 25, 2010

(51) Int. Cl.
*F21V 7/04* (2006.01)
(52) U.S. Cl. ............ 349/68; 362/1; 362/557; 362/97.1; 40/559; 40/560; 40/561; 349/61; 349/67
(58) Field of Classification Search ............... 349/58–61; 362/1, 557; 40/559–561
See application file for complete search history.

(56) References Cited

U.S. PATENT DOCUMENTS

| | | | | |
|---|---|---|---|---|
| 2,025,818 A | * | 12/1935 | Leigh .............................. | 40/571 |
| 4,789,889 A | * | 12/1988 | Morris et al. .................. | 257/203 |
| 4,846,096 A | * | 7/1989 | Hoehn .......................... | 116/334 |
| 5,722,754 A | * | 3/1998 | Langner ............................. | 362/1 |
| 5,777,704 A | * | 7/1998 | Selker .............................. | 349/58 |
| 6,795,137 B1 | * | 9/2004 | Whitted et al. ................. | 349/68 |
| 6,940,301 B2 | * | 9/2005 | Chen .............................. | 324/770 |
| 6,977,712 B2 | * | 12/2005 | Whitted et al. ............... | 349/199 |
| 7,110,062 B1 | * | 9/2006 | Whitted et al. ................. | 349/68 |

* cited by examiner

*Primary Examiner* — Anabel M Ton
(74) *Attorney, Agent, or Firm* — Kramer Levin Naftalis & Frankel LLP

(57) ABSTRACT

Apparatus and methods for harnessing external light to illuminate a display screen of an electronic device are provided. The display screen may be illuminated using a light harness, a reflector, a translucent surface, or any combination thereof. The light harness may be cylindrical or hexahedral. The light harness may be coupled to an external light input or a collector. The reflector may be repositioned toward or away from the display screen to reflect external light toward the display screen. The translucent surface may allow external light to pass through it to illuminate the display screen. The translucent surface may protect the rear face of the display screen, or the rear face of the display screen may itself be translucent.

56 Claims, 12 Drawing Sheets

EXTERNAL LIGHT ILLUMINATION OF DISPLAY SCREENS

FIELD OF THE INVENTION

This invention can relate to apparatus and methods for harnessing external light to illuminate a display screen of an electronic device.

BACKGROUND OF THE DISCLOSURE

Currently, there are a wide variety of electronic devices, such as laptop computers and cellular telephones, that include a display screen for presenting visual information to a user (e.g., a liquid crystal display ("LCD") screen). These electronic devices often devote significant portions of the physical space within the device to high-powered components for illuminating the display screen. However, these electronic devices may not be used effectively in certain physical settings, such as, for example, where the external or ambient light is brighter than the illumination of the display screen. As a result, a user may not be able to view the information on the display screen sufficiently. For example, a user may have difficulty viewing the information presented on a display screen of a laptop computer while outdoors on a sunny day.

Therefore, it would be beneficial to provide apparatus and methods for collecting external light to help illuminate a display screen of an electronic device.

SUMMARY OF THE DISCLOSURE

Apparatus and methods for harnessing external light to illuminate a display screen of an electronic device are provided. In one embodiment, an electronic device is provided that may include a display screen and a light harness. The light harness may include a first surface extending between a first end and a second end. The first end may be configured to collect light external to the electronic device, and the first surface may be configured to emit the collected light from the light harness for illuminating the display screen.

In one embodiment, an electronic device is provided that may include a display screen and a reflector having a first face operative to reflect light external to the electronic device toward the display screen for illuminating the display screen.

In one embodiment, a method of illuminating a display screen of an electronic device with a light harness is provided. The method may include positioning the light harness adjacent a first face of the display screen, collecting light external to the electronic device into the light harness, and emitting the collected light from the light harness toward the first face of the display screen.

In one embodiment, a method of illuminating a display screen of an electronic device with a reflector having a first face is provided. The method may include positioning the first face of the reflector opposite a first side of the display screen, and reflecting light external to the electronic device with the first face of the reflector toward the first side of the display screen.

BRIEF DESCRIPTION OF THE DRAWINGS

The above and other aspects and features of the invention will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
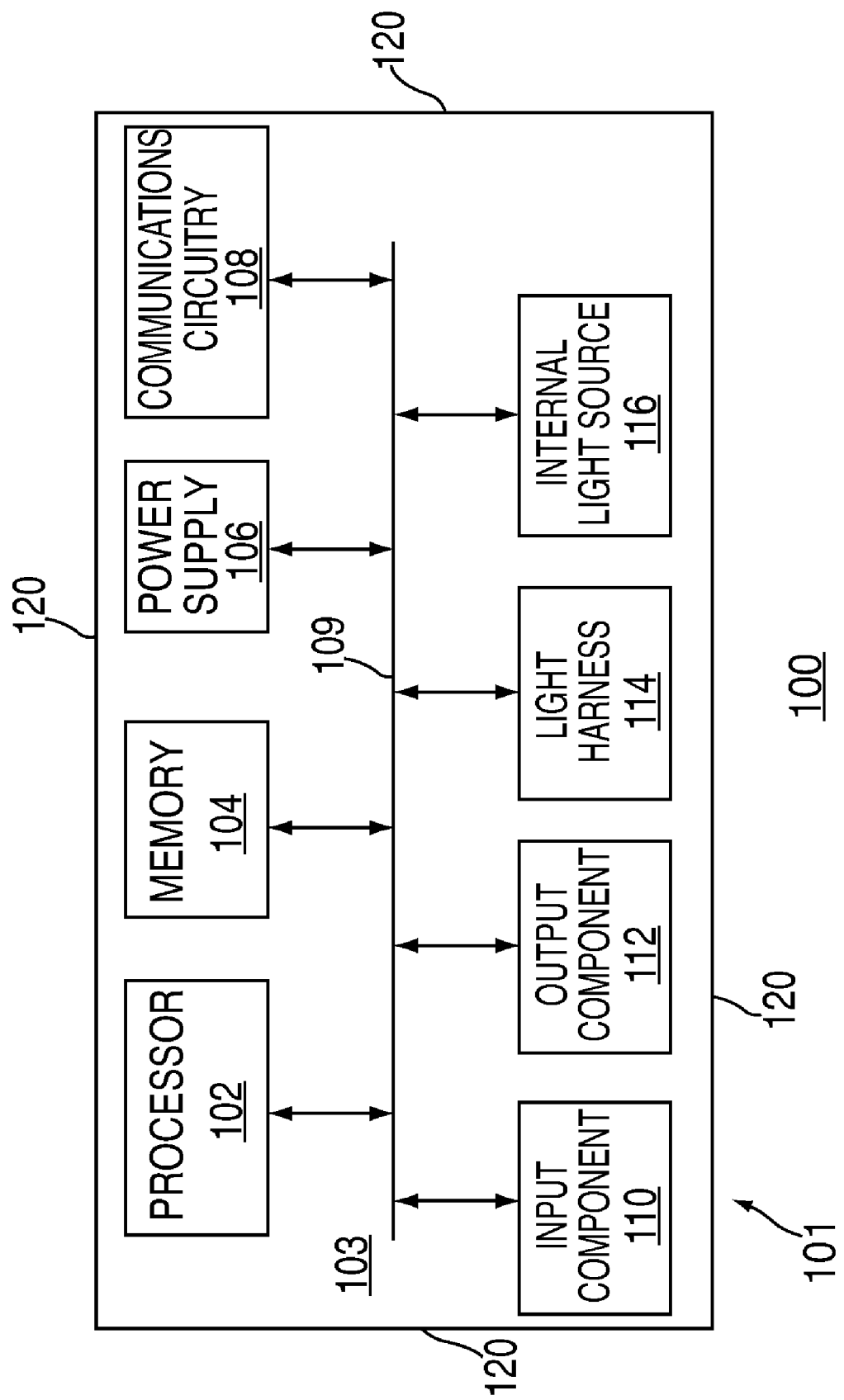
FIG. 1 shows a simplified schematic diagram of an electronic device in accordance with some embodiments of the invention.

In some embodiments, external light may be collected to illuminate a display screen of an electronic device. The external light may originate from any source or combination of sources sufficient to at least partially illuminate the display screen, such as an accessory light bulb, the centralized illumination system in a vehicle cabin, or the sun. The electronic device may be any device capable of presenting information to a user on a display screen. The display screen may include any suitable screen, such as a liquid crystal display ("LCD")

screen, that may present visual information to a user of an electronic device and, in some instances, accept user input information (e.g., a touch screen).

In some embodiments, a manifold or a light guide pipe may be used to redirect external light to illuminate a display screen of an electronic device. The manifold may be positioned behind or adjacent the display screen (e.g., along one of the edges of the display screen, such as the base) and may extend along the length of the display screen. In some embodiments, the manifold may be cylindrical with angled walls such that one end of the manifold has a larger diameter than the opposite end of the manifold. Light may travel into an open end of the manifold and the angled walls of the manifold may cause the light entering the open end of the manifold to be reflected within the manifold until the light may be collimated and able to exit the manifold through a wall portion. An interior surface of a wall portion of the manifold may include reflective material to improve the uniformity of the exiting light by aiming all light reflected within the manifold in one or more specific directions.

In some embodiments, the manifold may be hexahedral (e.g., rectangular or cubic), rather than cylindrical with angled walls. The manifold may contain reflecting cones at intervals along an interior surface of the manifold to aim light out from within the manifold. In some embodiments, the manifold may be coupled to a collector that may be shaped as a funnel or an umbrella, for example, to harness external light and channel it into the manifold.

In some embodiments, an array of internal light sources (e.g., "LED"s) may be positioned within the electronic device and along one or more edges of a display screen. For example, the internal light sources may be positioned along the same edge of the display screen as a manifold, or may be positioned along a different edge of the display screen than a manifold. The internal light sources may emit light across the display screen to illuminate the display screen. However, the light emitted by the internal light sources may not be sufficient in certain physical settings (e.g., outdoors) to properly illuminate the display screen. The internal light sources may also increase the power consumption of the electronic device. Therefore, a manifold or other light harness may be used along one or more edges of the display screen in conjunction with or as an alternative to the internal light sources to provide illumination to the display screen by emitting light channeled from an external light source across the display screen.

In some embodiments, a reflector may be used behind a display screen of an electronic device to reflect light toward the display screen. The reflector may reflect light exiting a manifold or light guide pipe that may be positioned behind or adjacent to the display screen. Additionally or alternatively, the reflector may reflect light emitted by internal light sources that may be positioned behind or adjacent to the display screen. The reflector may be removable from the electronic device and may have a reflective lining to enhance its ability to reflect light toward the display screen.

In some embodiments, the reflector may be coupled to the electronic device adjacent to an edge (e.g., the base) of the display screen such that the reflector may be pivoted to rotate away from the display screen. Once rotated away, the reflector may collect ambient light, such as sunlight, and may reflect the ambient light toward the display screen. Permitting the reflector to pivot away from the display screen may also allow ambient light to directly reach the display screen without being reflected by the reflector. In some embodiments, in order to pivot the reflector away from the display screen, a portion of the reflector may be magnetically or otherwise detachable from a portion of the display screen.

In some embodiments, a translucent surface may be provided, either as a removable surface positioned behind a display screen of an electronic device or as a permanent rear surface of a display screen, to pass or harness external light for illuminating the display screen. The translucent surface may also serve to protect the rear face of the display screen from damage.

In some embodiments, a translucent surface and a reflector may both be provided behind a display screen of an electronic device to harness external light for illuminating the display screen. The reflector may be positioned behind both the display screen and the translucent surface, or the reflector may be positioned between the display screen and the translucent surface. In some embodiments, the reflector may be removable from between the display screen and the translucent surface if a user of the electronic device wishes to use only the translucent surface to harness ambient light to illuminate the display screen. If there is no ambient light, the user may insert the reflector between the translucent surface and the display screen to reflect light from any other suitable source (e.g., from an array of internal light sources positioned adjacent the display screen and/or from a manifold positioned adjacent the display screen).

In some embodiments, the translucent surface may be positioned between the display screen and the reflector. The reflector may be similarly removable as described above, or the reflector may be configured to rotate away from the display screen and to expose the translucent surface to ambient light while reflecting additional ambient light toward the display screen.

Apparatus and methods for harnessing external light to illuminate a display screen of an electronic device are provided and described with reference to FIGS. 1-9.

FIG. 1 is a simplified schematic diagram of an electronic device 100 in accordance with some embodiments of the invention. The term "electronic device" can include, but is not limited to, music players, video players, still image players, game players, other media players, music recorders, video recorders, cameras, other media recorders, radios, medical equipment, domestic appliances, transportation vehicle instruments, musical instruments, calculators, cellular telephones, other wireless communication devices, personal digital assistants, remote controls, pagers, computers (e.g., desktops, laptops, tablets, servers, etc.), monitors, televisions, stereo equipment, set up boxes, set-top boxes, boom boxes, modems, routers, keyboards, mice, speakers, printers, and combinations thereof.

As shown in FIG. 1, electronic device 100 may include housing 101, processor 102, memory 104, power supply 106, communications circuitry 108, bus 109, input component 110, output component 112, light harness (e.g., a manifold) 114, and internal light source 116. Bus 109 may include one or more wired or wireless links that provide paths for transmitting data and/or power, to, from, or between various components of electronic device 100 including, for example, processor 102, memory 104, power supply 106, communications circuitry 108, input component 110, and output component 112.

Memory 104 may include one or more storage mediums, including, but not limited to, a hard-drive, flash memory, permanent memory such as read-only memory ("ROM"), semi-permanent memory such as random access memory ("RAM"), any other suitable type of storage component, and any combinations thereof. Memory 104 may include cache memory, which may be one or more different types of memory used for temporarily storing data for electronic device applications.

Power supply 106 may provide power to the electronic components of electronic device 100. In some embodiments, power supply 106 can be coupled to a power grid (e.g., when device 100 is not a portable device, such as a desktop computer). In some embodiments, power supply 106 can include one or more batteries for providing power (e.g., when device 100 is a portable device, such as a cellular telephone or a laptop computer). As another example, power supply 106 can be configured to generate power from a natural source (e.g., solar power using solar cells).

Communications circuitry 108 may be provided to allow device 100 to communicate with one or more other electronic devices using any suitable communications protocol. For example, communications circuitry 108 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, and any combinations thereof. Communications circuitry 108 can also include circuitry that enables device 100 to be electrically coupled to another device (e.g., a computer or an accessory device) and communicate with that other device.

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, microphone, camera, video recorder, and any combinations thereof. Each input component 110 may be configured to provide one or more dedicated control functions for making selections or issuing commands associated with operating device 100.

One or more output components 112 can be provided to present information (e.g., textual, graphical, audible, and/or tactile information) to a user of device 100. Output component 112 can take a variety of forms, including, but not limited to, audio speakers, headphones, signal line-outs, visual displays, antennas, infrared ports, rumblers, vibrators, and any combinations thereof.

It should be noted that one or more input components 110 and/or one or more output components 112 may sometimes be referred to individually or collectively herein as an input/output ("I/O") component or I/O or user interface. It should also be noted that one or more input components 110 and one or more output components 112 may sometimes be combined to provide a single I/O component or user interface, such as a touch screen that may receive input information through a user's touch of a display screen and that may also provide visual information to a user via that same display screen.

Housing 101 may at least partially enclose one or more of the various electronic components associated with operating electronic device 100 for protecting them from debris and other degrading forces external to device 100. In some embodiments, housing 101 may include one or more walls 120 that define a cavity 103 within which the various electronic components of device 100 can be disposed. In some embodiments, housing 101 can support various electronic components of device 100, such as I/O component 110 and/or I/O component 112.

In some embodiments, one or more of the electronic components of electronic device 100 may be provided within its own housing component (e.g., input component 110 may be an independent keyboard or mouse within its own housing component that may wirelessly or through a wire communicate with processor 102, which may similarly be provided within its own housing component). Housing 101 can be formed from a wide variety of materials including, but not limited to, metals (e.g., steel, copper, titanium, aluminum, and various metal alloys), ceramics, plastics, and any combinations thereof. Housing 101 may also help to define the shape or form of electronic device 100. That is, the contour of housing 101 may embody the outward physical appearance of electronic device 100.

A light harness 114 may be provided to capture light external to electronic device 100 and to channel the light for illuminating output component 112. For example, light harness 114 may include two open ends, each with the same diameter or each with different diameters, such as a larger end and a smaller end. Light harness 114 may be made of any suitable material, such as glass, and may be positioned behind or adjacent to output component 112 and may extend along the length of any edge of output component 112.

Moreover, one or more internal light sources 116 may be provided to illuminate output component 112. For example, each internal light source 116 may take various forms, including, but not limited to, an LED. In some embodiments, an array of internal light sources 116 may be positioned along an edge of output component 112, which may be the same edge as the position of light harness 114 or may be an edge different from or opposite to the position of light harness 114. However, the one or more internal light sources 116 may require large amounts of power from power supply 106 and may not provide sufficient illumination to output component 112 in certain environments (e.g., if electronic device 100 is outdoors).

Processor 102 of device 100 may control the operation of many functions and other circuitry provided by device 100. For example, processor 102 can receive input signals from input component 110 and/or drive output signals through output component 112.

Processor 102 may load a user interface program (e.g., a program stored in memory 104 or on another device or server) to determine how instructions received via input component 110 may manipulate the way in which information (e.g., information stored in memory 104 or on another device or server) is provided to the user (e.g., via output component 112). In some embodiments, processor 102 may control the operation of one or more electronic components of electronic device 100 based on any suitable condition. For example, processor 102 may cause one or more internal light sources 116 to emit light if processor 102 senses that electronic device 100 may be positioned in a location with insufficient ambient light to illuminate output component 112.

Figure 2A:
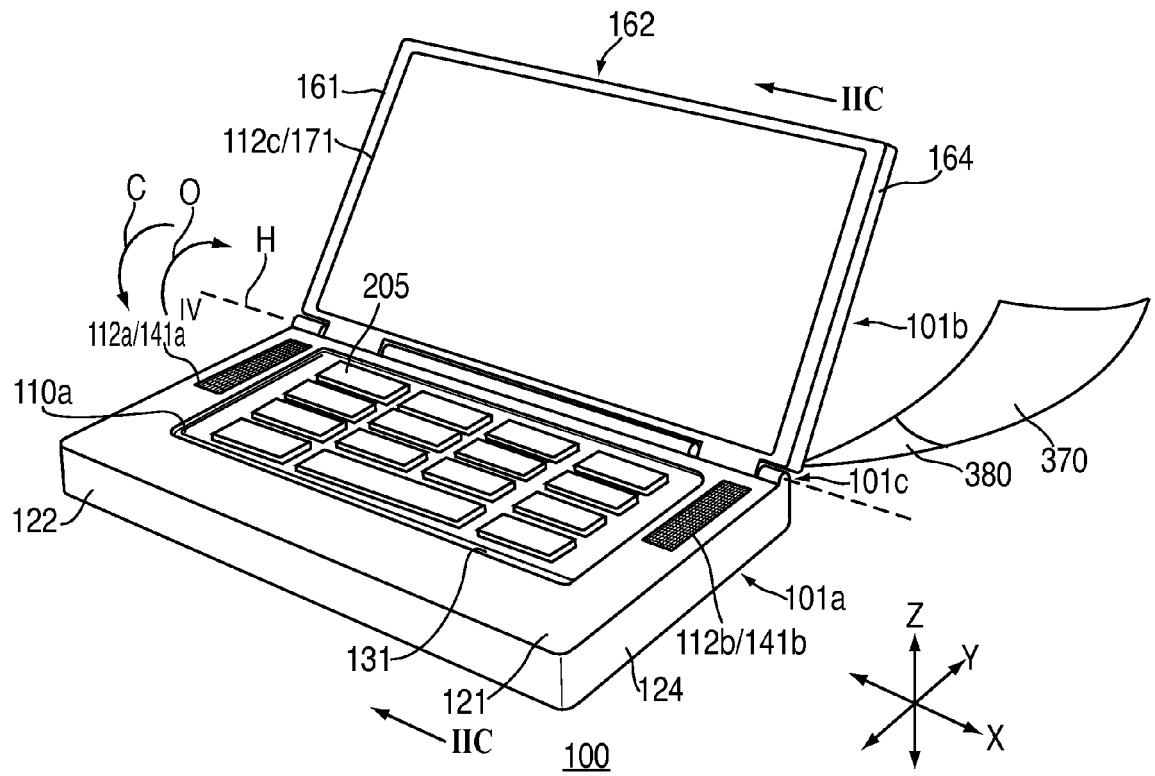
FIG. 2A shows a top, front, right perspective view of the electronic device of FIG. 1 in an open position in accordance with some embodiments of the invention.
Figure 2B:
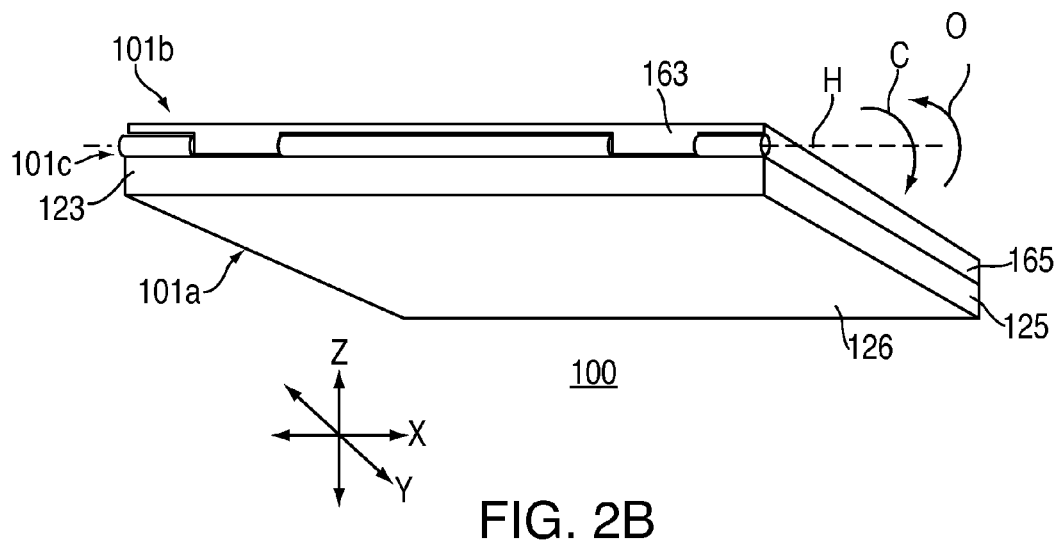
FIG. 2B shows a bottom, back, left perspective view of the electronic device of FIGS. 1 and 2A in a closed position in accordance with some embodiments of the invention.
Figure 2C:
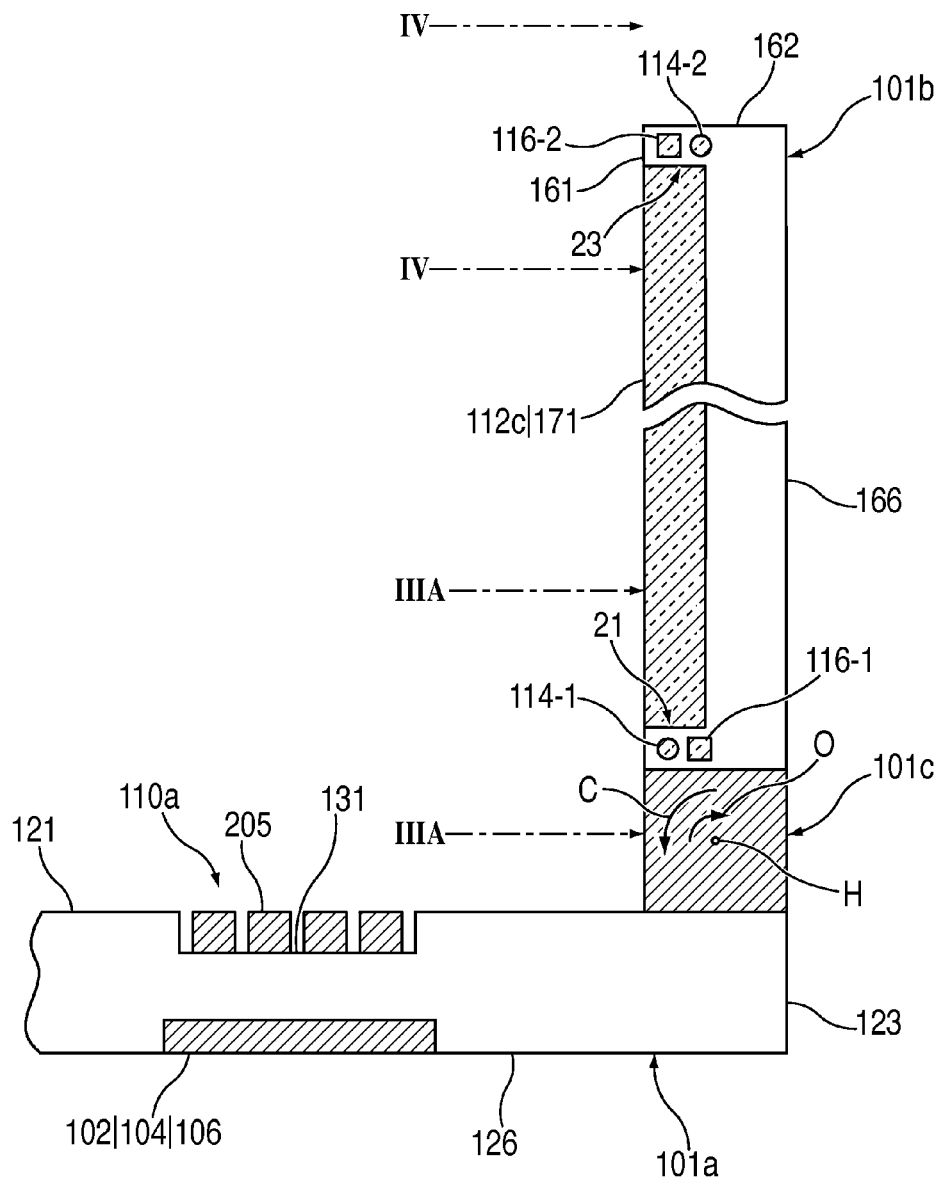
FIG. 2C is a cross-sectional view of the electronic device of FIGS. 1-2B, taken from line IIC-IIC of FIG. 2A, in accordance with some embodiments of the invention.

Electronic device 100 is illustrated in FIGS. 2A-2C to be a laptop computer, although it is to be understood that electronic device 100 may be any type of electronic device as described herein in accordance with the invention. As shown in FIGS. 2A and 2B, for example, housing 101 of electronic device 100 may be configured to provide two housing components coupled together by a hinge or clutch assembly. Particularly, housing 101 may include a base housing component 101a and a display housing component 101b coupled to one another by a hinge assembly 101c, also known as clutch assembly 101c. Housing components 101a, 101b, and 101c may be configured such that electronic device 100 may be "opened" for use (see, e.g., FIG. 2A) by rotating display housing component 101b away from base housing component 101a in the direction of arrow O about hinge axis H of hinge assembly 101c, and such that electronic device 100 may be "closed" (see, e.g., FIG. 2B) by rotating display housing component 101b towards base housing component 101a in the direction of arrow C about hinge axis H. However, it should be noted that housing 101 of device 100 is only exemplary and need not include two substantially hexahedral portions coupled by a hinge. For example, in certain embodiments, the housing of device 100 could generally be formed in any other suitable shape, including, but not limited to, one or more housing components or portions that are substantially spherical, ellipsoidal, conoidal, octahedral, and any combinations thereof.

Base housing component 101a may include a top wall 121, various side walls, such as front wall 122, back wall 123, right wall 124, and left wall 125, and a bottom wall 126 opposite top wall 121. In some embodiments, one or more openings may be provided through one or more of the walls of housing component 101a to at least partially expose one or more components of electronic device 100. For example, as shown in FIGS. 2A and 2C, an opening 131 may be provided through top wall 121 of base housing component 101a to at least partially expose an input component 110a of electronic device 100 (e.g., a keyboard assembly). In some embodiments, as shown in FIG. 2A, for example, openings 141a and 141b may be provided through top wall 121 of base housing component 101a to at least partially expose respective output components 112a and 112b of electronic device 100 (e.g., speaker components).

Likewise, as shown in FIGS. 2A-2C, display housing component 101b may include a top wall 162, various side walls, such as front wall 161, back wall 166, right wall 164, and left wall 165, and a bottom wall 163 opposite top wall 162. In some embodiments, one or more openings may be provided through one or more of the walls of housing component 101b to at least partially expose one or more components of electronic device 100. For example, as shown in FIGS. 2A and 2C, an opening 171 may be provided through front wall 161 of display housing component 101b to at least partially expose an output component 112c of electronic device 100 (e.g., a display screen).

Input component 110a is illustrated in FIGS. 2A and 2C to be a keyboard assembly with one or more keys 205, although it is to be understood that input component 110a exposed by opening 131 through top wall 121 of housing component 101a may be any type of input component as described herein in accordance with the invention. Moreover, although output components 112a and 112b are illustrated in FIG. 2A to be audio speakers, it is to be understood that each one of output components 112a and 112b exposed by a respective opening 141 through top wall 121 of housing component 101a may be any type of output component as described herein in accordance with the invention. Similarly, although output component 112c is illustrated in FIGS. 2A and 2C to be a visual display, it is to be understood that output component 112c exposed by opening 171 through front wall 161 of housing component 101b also may be any type of output component as described herein in accordance with the invention.

FIG. 2C is a cross-sectional view of the electronic device of FIGS. 1-2B, taken from line IIC-IIC of FIG. 2A, in accordance with some embodiments of the invention. Base housing component 101a may incorporate any suitable components of electronic device 100, such as processor 102, memory 104, power supply 106, or any other suitable component. Hinge assembly 101c may permit display housing component 101b to rotate about hinge axis H with respect to base housing component 101a in the direction of arrow O to "open" electronic device 100 or in the direction of arrow C to "close" electronic device 100.

As shown in FIG. 2C, display housing component 101b may include display screen 112c and also may include any suitable light harness (e.g., manifold) and any suitable number of internal light sources to illuminate display screen 112c. For example, display housing component 101b may include a light harness 114-1 positioned between hinge assembly 101c and bottom edge 21 of display screen 112c. A second light harness 114-2 may be positioned between top edge 23 of display screen 112c and top wall 162 of display housing component 101b. Light harnesses 114-1 and 114-2 may be used to channel light from any suitable external source across display screen 112c to illuminate display screen 112c. Display housing component 101b also may include an array of one or more internal light sources 116-1 positioned between hinge assembly 101c and bottom edge 21 of display screen 112c and adjacent light harness 114-1. Similarly, an array of one or more internal light sources 116-2 may be positioned between top edge 23 of display screen 112c and top wall 162 of display housing component 101b and adjacent light harness 114-2. Internal light sources 116-1 and 116-2 may emit light across display screen 112c to illuminate display screen 112c.

In some embodiments, display housing component 101b may include any suitable alternative arrangement of light harnesses and internal light sources to illuminate display screen 112c. For example, display housing component 101b may include only one light harness 114-1 or 114-2 and no internal light sources because internal light sources may consume large amounts of power from power supply 106. In some embodiments, a light harness may be included in display housing component 101b in any suitable position with respect to an array of light sources. For example, a light harness and internal light sources may be positioned adjacent to one another, as shown in FIG. 2C, but along only one edge of display screen 112c. Alternatively, a light harness may be positioned on one edge of display screen 112c (e.g., bottom edge 21) that may be opposite from the position of an array of internal light sources (e.g., positioned on top edge 23). In some embodiments (not shown), one or more light harnesses and one or more arrays of internal light sources may be positioned behind or in front of display screen 112c.

Figure 3A:
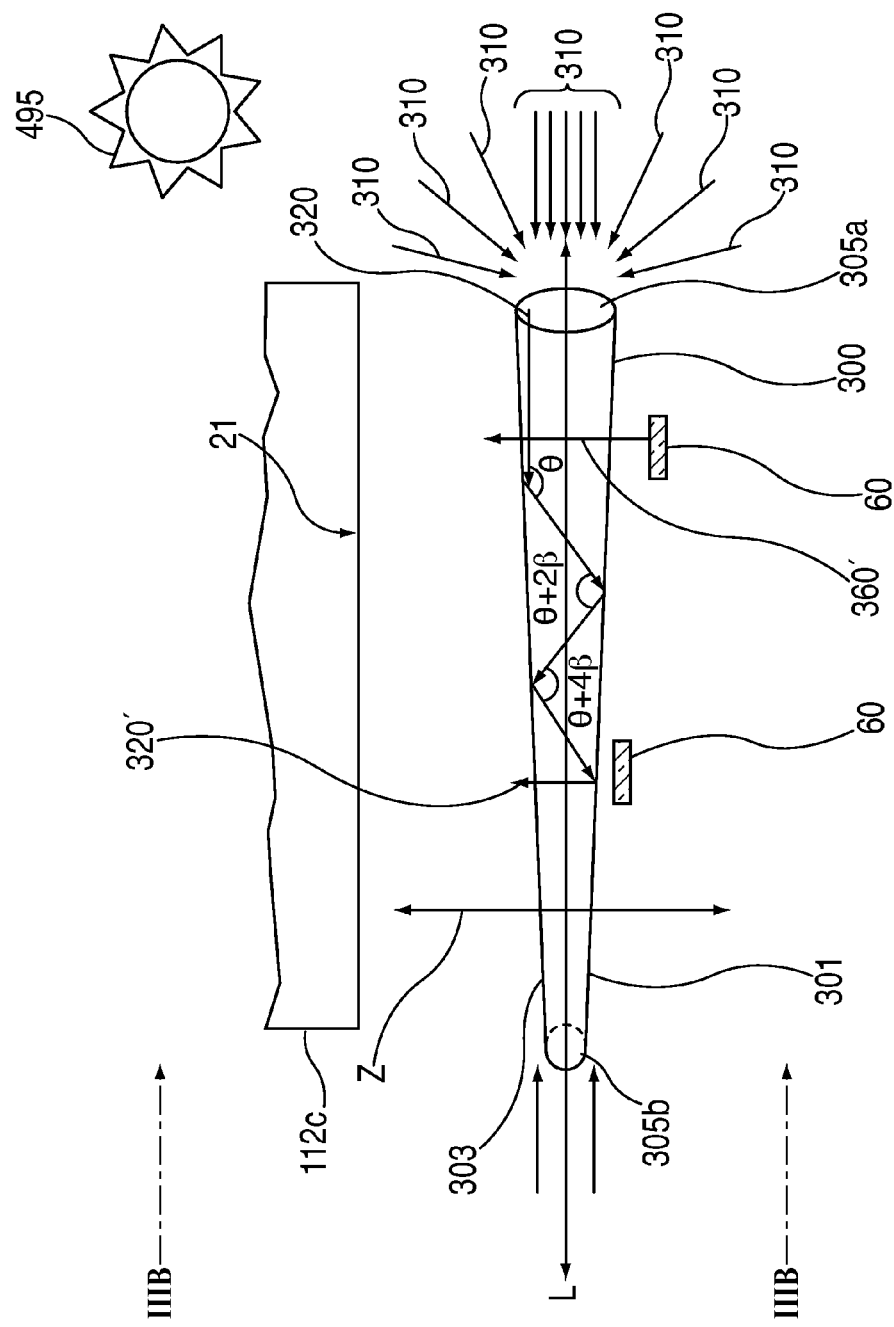
FIG. 3A shows a horizontal cross-sectional view of a portion of the electronic device of FIGS. 1-2C, taken from line IIIA-IIIA of FIG. 2C, in accordance with some embodiments of the invention.

FIG. 3A shows a perspective view of a light harness (e.g., a manifold) in accordance with some embodiments of the invention. Light harness 114-1 may be provided as a manifold 300, that may include two open ends having different cross-sectional areas (e.g., different diameters), such as larger end 305a and smaller end 305b. In some embodiments, light harness 114-1 may include two open ends having the same cross-sectional area (e.g., the same diameter) and the walls of manifold 300 between the two open ends may be parallel to longitudinal axis L.

Manifold 300 may be made of any suitable material, such as glass, and may include surface treatments on internal surface 301 and/or internal surface 303 (e.g., white dots of ink or areas where the internal surface 301 or 303 may include roughness) that may be used to balance light entering manifold 300, or to spread light within manifold 300 in a desired manner, before the light exits manifold 300 to illuminate display screen 112c. Manifold 300 may be positioned in any suitable manner to illuminate a display screen of an electronic device. For example, manifold 300 may be positioned below display screen 112c at its base (e.g., along bottom edge 21 of display screen 112c of FIG. 2C as shown with light harness 114-1). In some embodiments, an array of one or more internal light sources 60 (or light sources 116-1 of FIG. 2C) may be positioned along an edge of display screen 112c. In some embodiments, internal light sources 60 may be positioned along the same edge 21 as manifold 300, along a different edge (e.g., opposite edge 23) to emit light (e.g., light 360') across the surface of display screen 112c, or behind or in front of display screen 112c. In some embodiments (not shown), internal light sources 60 also may be positioned at one end of manifold 300 and may emit light into manifold 300 for reflection across display screen 112c. However, internal light sources 60 may consume a large amount of power from power supply 106 (see, e.g., FIGS. 1, 2C) to illuminate display screen 112c and also may not sufficiently illuminate display screen 112c if electronic device 100 is exposed to a certain amount of ambient light.

Light 310 from an external source 495 (e.g., the sun, or an auxiliary light bulb positioned near end 305a, and/or any other accessory illuminator with a separate battery that may power only the illuminator) may be positioned near and may travel into an end of manifold 300 (e.g., larger end 305a). Ray of light 320 from external source 495, for example, may enter end 305a of manifold 300 and may be initially reflected by the top interior surface 303 of manifold 300 at an initial angle θ. Ray 320 may be reflected within manifold 300 from initial angle θ to a second angle θ+2β by bottom internal surface 301 and then to a third angle θ+4β, and yet again until the angle of reflection of ray 320 may be greater than the total internal reflection of the material lining the interior of manifold 300.

Ray 320 may then exit from manifold 300 as light ray 320' in a direction parallel to axis Z, which may be perpendicular to longitudinal axis L of manifold 300, to illuminate display screen 112c. In some embodiments, light ray 320' may include any suitable residual angle with respect to manifold 300. Manifold 300 (e.g., walls 301 and 303) may be angled with respect to display screen 112c such that all light 310 entering manifold 300, such as ray 320, may be aimed (e.g., may exit manifold 300 in a direction parallel to axis Z or in a direction forming any other suitable residual angle with manifold 300) out of manifold 300 towards display screen 112c. In some embodiments, manifold 300 may include surface treatments on internal surface 301 and/or internal surface 303 (e.g., white dots of ink or areas where the internal surface 301 or 303 may include roughness) that may be used to balance light entering manifold 300 (e.g., ray 320), or to scatter light in a desired manner, before the light exits manifold 300 to illuminate display screen 112c.

Figure 3B:
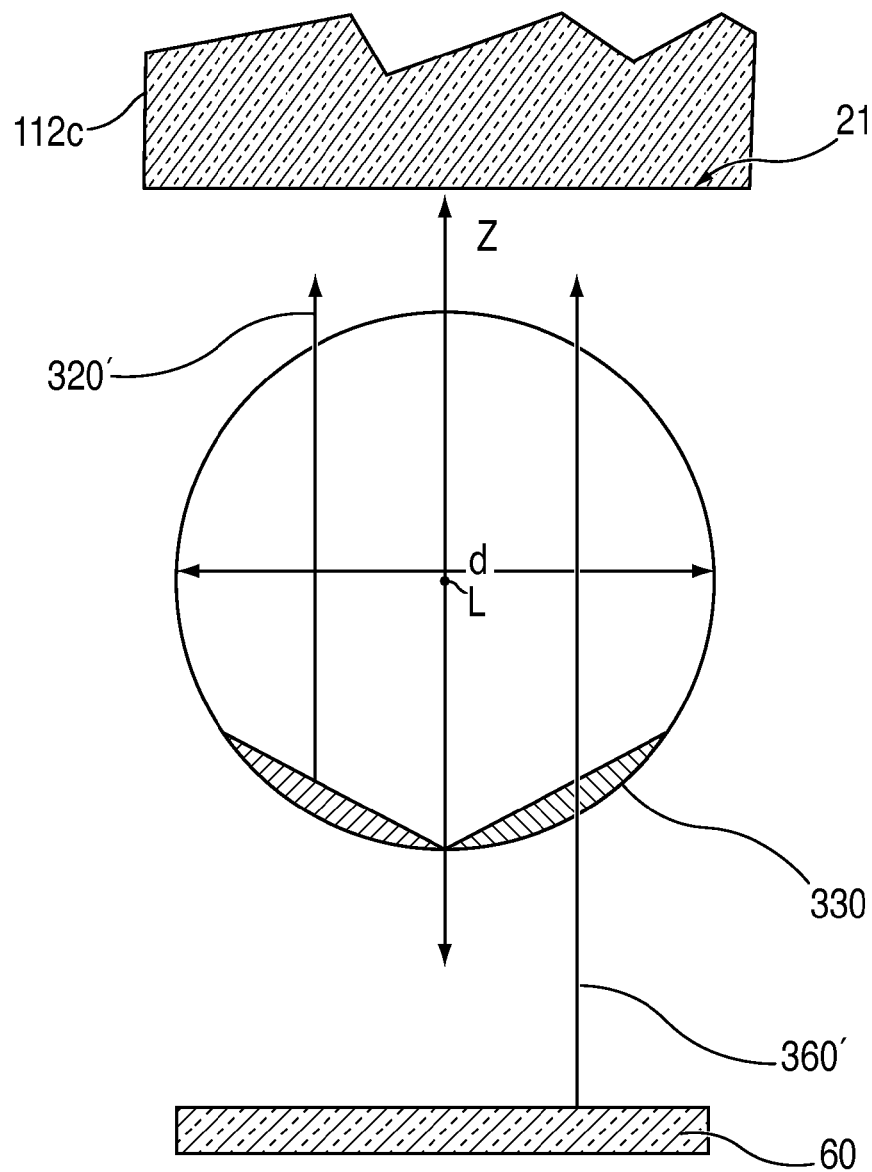
FIG. 3B shows a vertical cross-sectional view of a portion of the electronic device of FIGS. 1-3A, taken from line IIIB-IIIB of FIG. 3A, in accordance with some embodiments of the invention.

As shown in FIG. 3B, manifold 300 may include an internal cross-sectional area of diameter d that may decrease between the diameter of larger end 305a (e.g., a diameter of three millimeters) and the diameter of smaller end 305b (e.g., a diameter of one millimeter). In some embodiments, the internal cross-sectional area of manifold 300 may depend on the brightness of external source 495 and/or the degree of collimation of ray of light 320. Manifold 300 may include any suitable reflective material 330 positioned along at least bottom surface 301 of manifold 300. Reflective material 330 may be oriented with respect to manifold 300 so as to aim light (e.g., collimated light ray 320') upwards out of manifold 300 in a direction parallel to axis Z. Reflective material 330 also may prevent light from exiting through bottom surface 301 of manifold 300 and away from display screen 112c.

In some embodiments, one or more internal light sources 60 (e.g., LEDs) may be positioned underneath or behind manifold 300 with respect to display screen 112c, as shown in FIGS. 3A and 3B, to emit light (e.g., light 360') across the surface of display screen 112c. Internal light sources 60 may scatter light 360' in any suitable direction, including for example, the same angle at which light may be emitted from manifold 300, or at any suitable angle with respect to manifold 300 or display screen 112c, to illuminate display screen 112c. Internal light sources 60 may be used in conjunction with manifold 300 to illuminate display screen 112c using light rays 320' and 360'.

Figure 4:
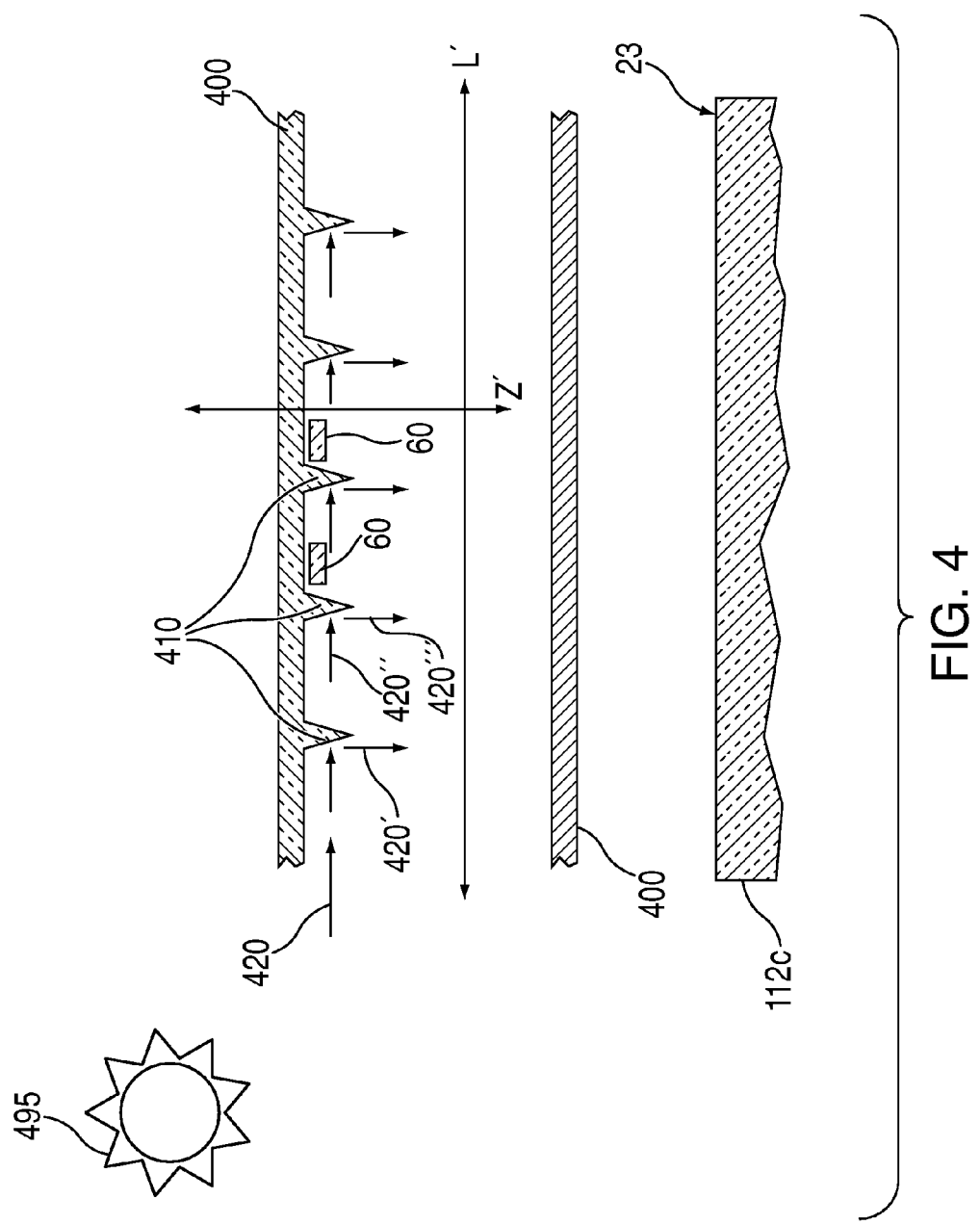
FIG. 4 shows a cross-sectional view of a portion of the electronic device of FIGS. 1-3B, taken from line IV-IV of FIG. 2C in accordance with some embodiments of the invention.

FIG. 4 shows a cross-sectional view of a portion of electronic device 100 including a light harness 114-2 in accordance with some embodiments of the invention. Light harness 114-2 may be provided as a manifold 400 that may perform a similar function as manifold 300 of FIG. 3A when placed near an edge of a display screen (see, e.g., top edge 23 of display screen 112c of FIGS. 2C and 4). Manifold 400 may have a square cross-section (not shown) or any other suitable shape. For example, manifold 400 may have dimensions of one millimeter in height and width, and a length equal to the length of an edge of display screen 112c.

Manifold 400 may include any suitable number of reflecting cones 410 that may be molded into manifold 400 to aim light traveling across manifold 400. Reflecting cones 410 may be coated with any suitable coating, such as a silver coating, to permit reflection of external light traveling across manifold 400. In some embodiments, reflecting cones 410 may be more closely spaced together toward the end furthest from where light enters manifold 400.

As shown in FIG. 4, external light, such as ray 420, may enter manifold 400 and may encounter one or more reflecting cones 410. A portion of ray 420, such as ray 420' from external light source 495, may be reflected downwards out of manifold 400 in a direction parallel to axis Z' (e.g., an axis perpendicular to a longitudinal axis L' of manifold 400) to illuminate a portion of display screen 112c. The remaining portion of light, such as ray 420", may travel across manifold 400 until it reaches another reflecting cone 410, and a portion of ray 420" (e.g., ray 420'") may be reflected out of manifold 400 also in a direction parallel to axis Z' to illuminate another portion of display screen 112c. The remaining portion of ray 420 may travel across a portion of the remaining length of manifold 400 and may reflect a portion of its light downwards out of manifold 400 with each encounter of another reflecting cone 410. Using manifold 300 and/or manifold 400 to illuminate a display screen may lower the power consumption and the weight of an electronic device, as an internal light source that may increase battery usage and the weight of the electronic device may not be necessary.

In some embodiments, manifold 400 may also be integrated with any suitable number of internal light sources 60. For example, an internal light source 60 (e.g., an LED) may be placed between two reflecting cones 410, as shown in FIG. 4, and may emit light in a direction parallel to axis Z' toward and across display screen 112c. The combination of the light emitted from the internal light sources and the light reflected by reflecting cones 410 may increase the amount of aimed light exiting manifold 400 in a direction parallel to axis Z'.

FIG. 2A also shows a perspective view of a collector and a light harness input coupled to electronic device 100 in accordance with some embodiments of the invention. A light harness 114 of device 100 (e.g., manifold 300 of FIGS. 3A and 3B or manifold 400 of FIG. 4) may be coupled to a collector 370 via a light harness input 380. Collector 370 may include any suitable material and be of any suitable shape for collecting light from an external light source (e.g., external ambient light 310 or 420 from external light source 495 of FIGS. 3A and 4). For example, collector 370 may be a mirror placed externally to electronic device 100. In some embodiments, collector 370 may resemble an open-mouthed funnel. Collector 370 may be pointed at an external light source. For example, if collector 370 is a solar collector, then collector 370 may be exposed to sunlight and may be configured to face the sun (e.g., external light source 495 of FIGS. 3A and 4).

The user of electronic device 100 may position collector 370 toward a light source, or collector 370 may be configured to automatically redirect itself toward a light source (e.g., with light detectors, solar power cells, or a motor). In some embodiments, collector 370 may be constructed so that the user of electronic device 100 may be protected from the light source while collector 370 collects light from the light source. For example, collector 370 may resemble an umbrella, and may include thin reflective material on a lightweight frame that the user may collapse when not in use.

Collector 370 may be coupled to light harness input 380 at the base of collector 370. Input 380 may include any suitable material and may be of any suitable shape to channel light obtained by collector 370 into a light harness of device 100. For example, input 380 may include a fiber optic cable that may focus a high intensity of light from collector 370 into a light harness (e.g., manifold 300 of FIGS. 3A and 3B or manifold 400 of FIG. 4) for spreading the collected light across the length of display screen 112c. In some embodiments, electronic device 100 may be placed in an isolated location that may have an intense light source other than a solar source. Using a fiber optic cable, such as light harness input 380 for collecting and channeling light, may allow a user to forgo coupling collector 370 to light harness input 380 while adequately illuminating display screen 112c.

FIGS. 5A-5D show an electronic device 500 in accordance with some embodiments of the invention. Electronic device 500 may include an input mechanism 510 and a display screen 520 that may be the same as, and may include some or all of the features of, electronic device 100 (FIGS. 1-4), input component 110 (FIGS. 1-2C) and display screen 112c (FIGS. 1-4). Electronic device 500 may include a reflector 550, at least a portion of which may be coupled to device 500 adjacent or to the rear of display screen 520. Reflector 550 may be used to reflect light when in a closed position (e.g., a portion 551 of reflector 550 may adhere, snap, or be held magnetically to device 500 such that reflector 550 may be positioned along the rear of display screen 520 in a closed position of FIGS. 5A and 5C).

Figure 5B:
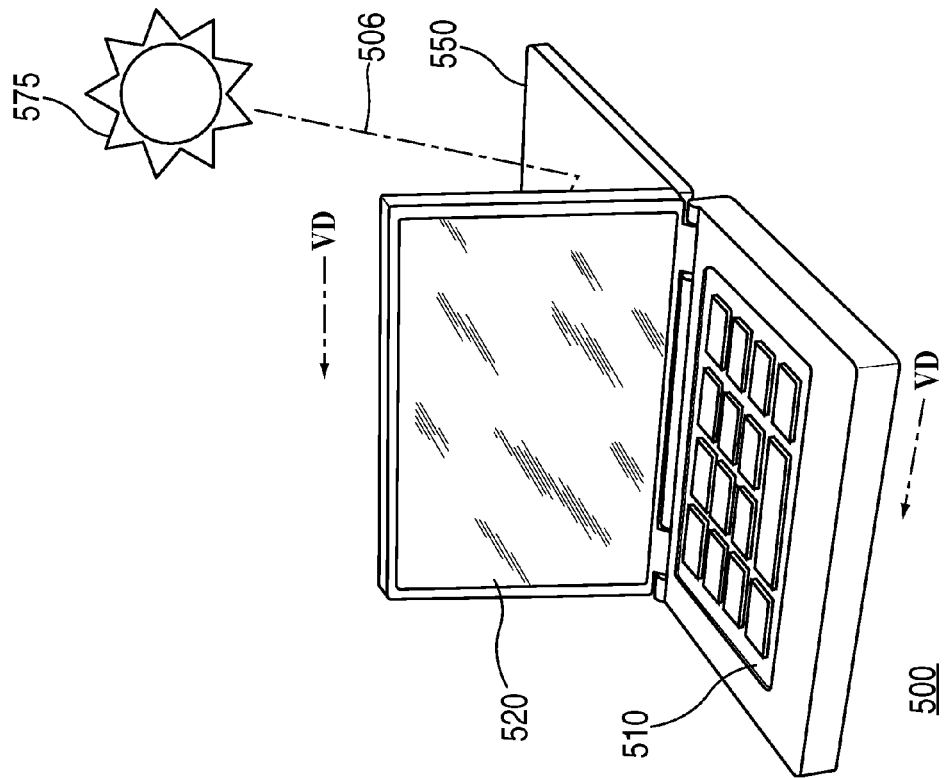
FIG. 5B shows the electronic device of FIG. 5A with the reflector in an open position in accordance with some embodiments of the invention.
Figure 5A:
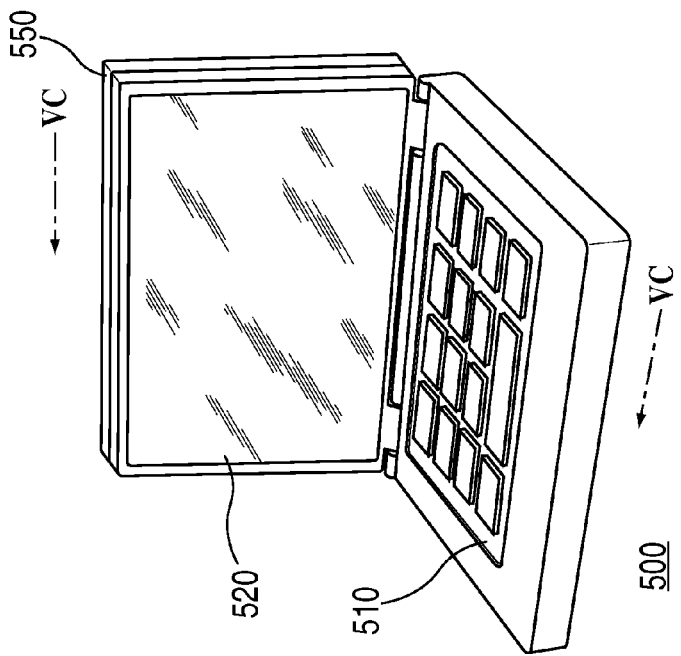
FIG. 5A shows an electronic device with a reflector in a closed position in accordance with some embodiments of the invention.
Figure 5C:
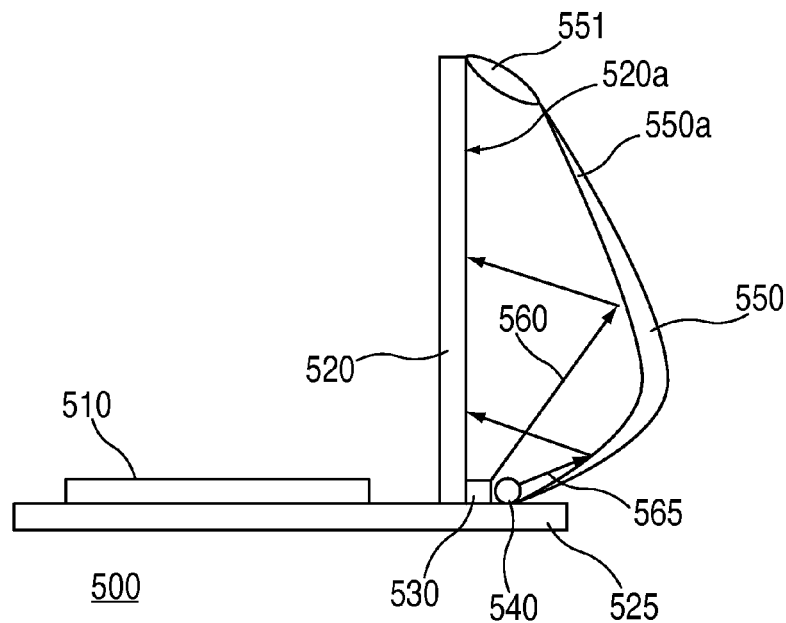
FIG. 5C shows a cross-sectional view of the electronic device of FIGS. 5A and 5B, taken from line VC-VC of FIG. 5A, in accordance with some embodiments of the invention.
Figure 5D:
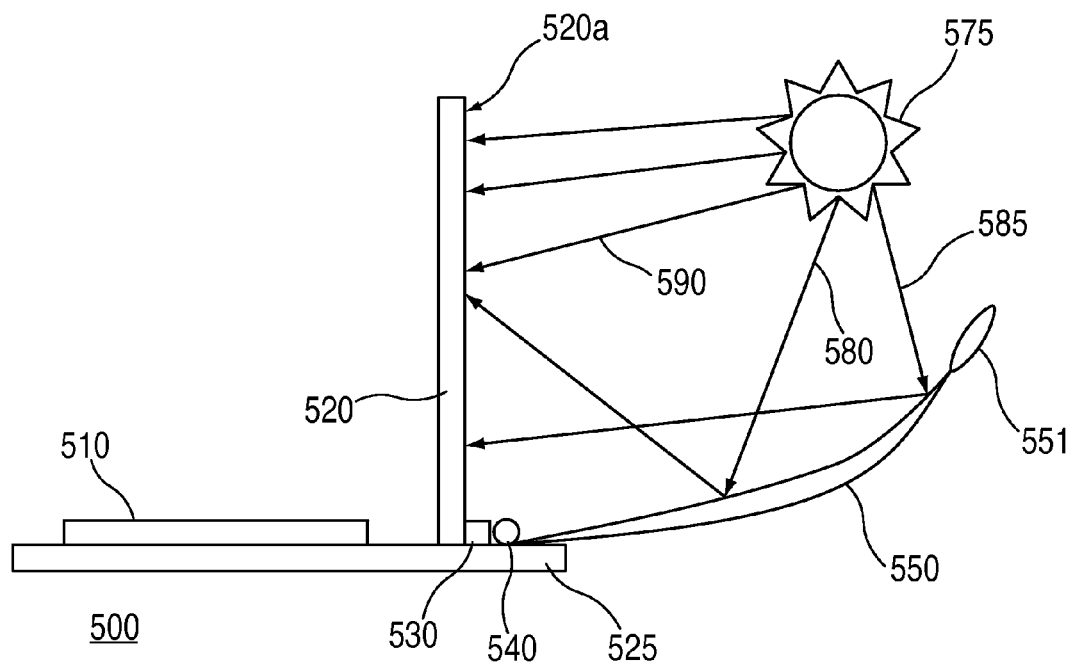
FIG. 5D shows a cross-sectional view of the electronic device of FIGS. 5A-5C, taken from line VD-VD of FIG. 5B, in accordance with some embodiments of the invention.

FIGS. 5B and 5D show electronic device 500, but with reflector 550 in an open position, in accordance with some embodiments of the invention. Reflector 550 may be coupled to the base of display screen 520 or to a hinge assembly 101c (FIGS. 2A-2C) or any other portion of device 500 such that reflector 550 may be opened for use (see, e.g., FIGS. 5B and 5D) by rotating a portion of reflector 550 (e.g., portion 551) using hinge assembly 101c away from display screen 520, and such that reflector 550 may be closed (see, e.g., FIGS. 5A and 5D) by rotating the portion of reflector 550 (e.g., portion 551) using hinge assembly 101c towards display screen 520. Alternatively, reflector 550 may be coupled to any other suitable component that may allow reflector 550 to rotate or otherwise move with respect to display screen 520. When exposed to an external light source 575 (e.g., the sun), reflector 550 may collect light emitted by light source 575, such as ray 506 (FIG. 5B) or rays 580, 585, and 590 (FIG. 5D), and may redirect ray 506 or rays 580, 585, and 590 toward display screen 520. Portion 551 of reflector 550 may be released to rotate away from display screen 520 using any suitable means, such as by pressing a button or using a wrist flick motion similar to that used to open a cellular telephone.

Electronic device 500 may include keyboard 510 for a user to provide inputs to electronic device 500, circuit board 525 (which may include processor 102, memory 104, power supply 106, and/or communications circuitry 108 of FIG. 1) for processing signals generated by and received by electronic device 500, and any other suitable features.

Electronic device 500 may include an array of internal light sources 530 positioned along an edge of display screen 520 that may emit light to provide illumination of display screen 520. Electronic device 500 may also include a light harness 540, positioned along an edge of display screen 520, that may be the same as, and may include some or all of the features of, either manifold 300 of FIGS. 3A and 3B or manifold 400 of FIG. 4, for example.

FIG. 5C shows a side view of electronic device 500 with reflector 550 in a closed position in accordance with some embodiments of the invention. As shown in FIG. 5C, reflector 550 may include any suitable material to collect and reflect light emitted by internal light sources 530 (e.g., ray 560), light harness 540 (e.g., ray 565), or any other suitable light source toward rear face 520a of display screen 520. For example, reflector 550 may include a silver, or any other suitable reflective material, lining on face 550a (e.g., the face closest to rear face 520a) to enhance the reflection of light by reflector 550. Reflector 550 may also lower the power consumption of electronic device 500, for example, by eliminating the need for an internal light source 530 to draw on the battery power (e.g., power supply 106, FIG. 1) of electronic device 500 to illuminate display screen 520. Reflector 550 also may include any suitable shape to collect and reflect the emitted light. For example, reflector 550 may be curved as shown, or reflector plate 550 may be flat, angular (e.g., forming a "V" shape), elliptical, or any other suitable shape.

FIG. 5D shows a side view of electronic device 500 with reflector 550 in an open position, in accordance with some embodiments of the invention. As shown, reflector 550 may be coupled (e.g., hinged) to electronic device 500 behind internal light sources 530 and light harness 540, for example, thereby permitting reflector 550 to rotate away from display screen 520 to collect ambient light or to rotate toward display screen 520 to reflect light emitted by internal light sources 530 and/or light harness 540. For example, a user of electronic device 500 may take electronic device 500 outdoors into sunlight. Internal light sources 530 and light harness 540 may not emit sufficient light to illuminate display screen 520 in the sunlit environment so that the user may use electronic device 500. The user may rotate reflector 550 away from display screen 520, such as by pressing a button, detaching portion 551 of reflector 550 magnetically or otherwise from the top of display screen 520, or using a wrist flick motion similar to that used to open a cellular telephone. Reflector 550, when rotated downward into an open position, may collect ambient light, such as rays 580 and 585 from light source 575, and may reflect rays 580 and 585 toward rear face 520a of display 520. Ambient light may also reach rear face 520a without first contacting reflector 550, as shown with ray 590, for example.

In some embodiments, reflector 550 may be moved in any suitable fashion to collect and reflect light toward display screen 520. The direction in which reflector 550 may be moved may depend on the direction from which the light being used to illuminate display screen 520 is coming. For example, reflector 550 may rotate away from or towards display screen 520, as described. Alternatively, reflector 550 may be rotated, slid, or otherwise moved from side to side or at an angle with respect to any edge of display screen 520.

Figure 6A:
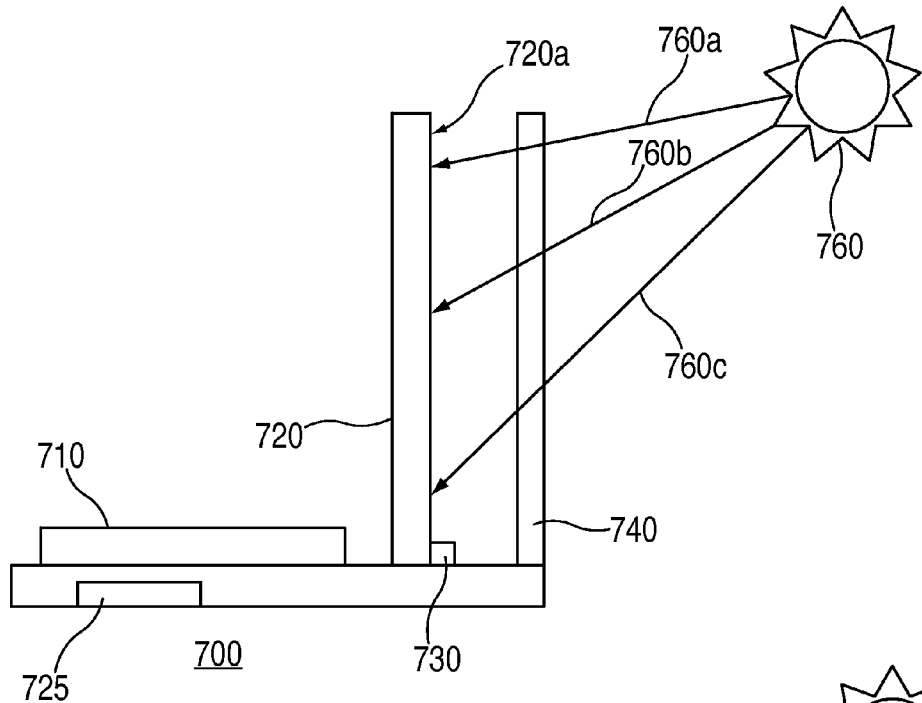
FIG. 6A shows a side view of an electronic device including a translucent surface in accordance with some embodiments of the invention.

FIG. 6A shows a side view of an electronic device with a translucent surface in accordance with some embodiments of the invention. Electronic device 700 may include keyboard 710, display screen 720, circuit board 725, and internal light sources 730, all of which may be the same as, and may include some or all of the features of, electronic device 500, keyboard 510, display screen 520, circuit board 525, and internal light sources 530, respectively, of FIGS. 5A-5D. Electronic device 700 may also include a translucent surface 740. Translucent surface 740 may include any suitable material and may be of any suitable shape for permitting light from an external light source 760 to pass through translucent surface 740 to provide illumination of display screen 720, while also protecting rear face 720a of display screen 720. For example, external light source 760 may emit rays 760a, 760b, and 760c that may contact translucent surface 740. Translucent surface 740 may allow rays 760a, 760b, and 760c to pass through translucent surface 740 and contact rear face 720a of display screen 720 to illuminate display screen 720.

In some embodiments, rather than positioning translucent surface 740 behind display screen 720, rear face 720a of display screen 720 may itself be translucent, thereby allowing display screen 720 to use ambient light, provided that rear face 720a is facing the ambient light source. Translucent surface 740 may be provided in any of the embodiments described herein to protect the rear face of a display screen.

Figure 6B:
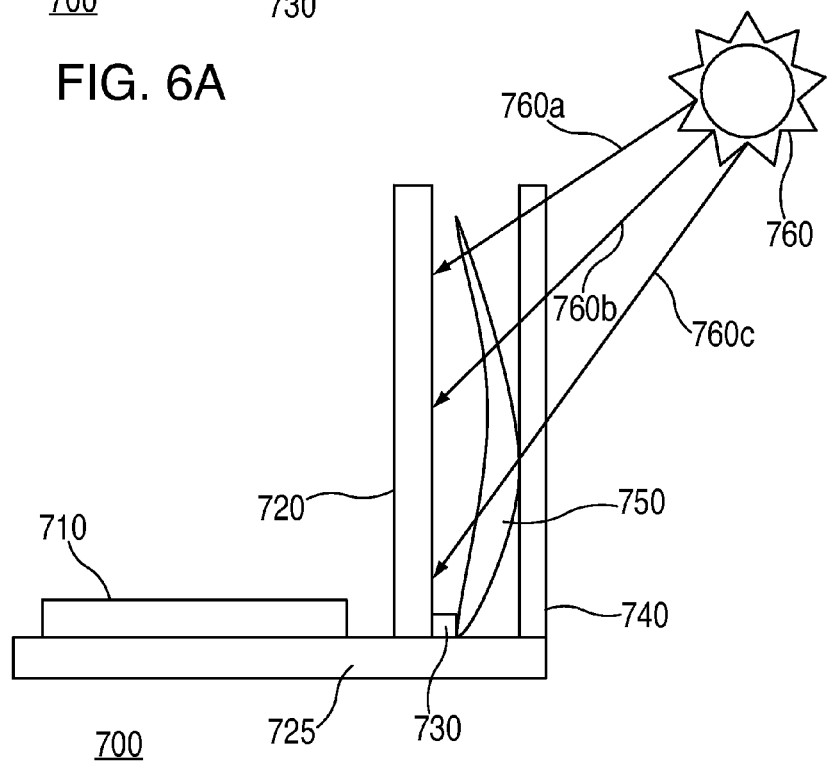
FIG. 6B shows a side view of the electronic device of FIG. 6A including a reflector in accordance with some embodiments of the invention.

FIG. 6B shows a side view of electronic device 700, but with a reflector 750 positioned between translucent surface 740 and display screen 720 in accordance with some embodiments of the invention. At the base or adjacent any other portion of display screen 720, electronic device 700 also may include an array of internal light sources and/or a light harness 730 for use in illuminating display screen 720 or channeling ambient light to illuminate display screen 720. Translucent surface 740 may be removable from electronic device 700. Reflector 750 may be the same as, and may include some or all of the features of, reflector 550. Reflector 750 may be removable from between display screen 720 and translucent surface 740 if, for example, a user of electronic device 700 desires ambient light (e.g., rays 760a, 760b, and 760c of ambient source 760) to pass through translucent surface 740 to illuminate display screen 720. If there is no ambient light sufficient to illuminate display screen 720, then the user may replace reflector 750 between display screen 720 and translucent surface 740. Reflector 750 may reflect light emitted by an array of internal light sources and/or light harness 730 toward display screen 720.

Figure 7A:
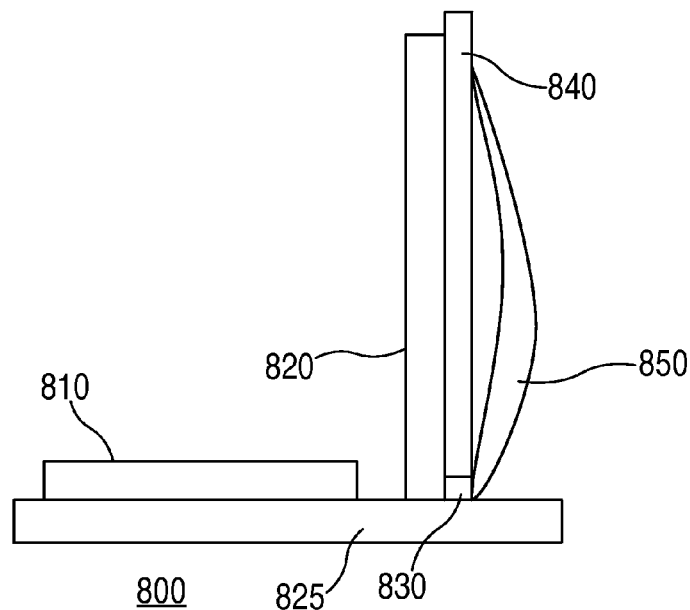
FIG. 7A shows a side view of an electronic device including a translucent surface and a reflector in accordance with some embodiments of the invention.
Figure 7B:
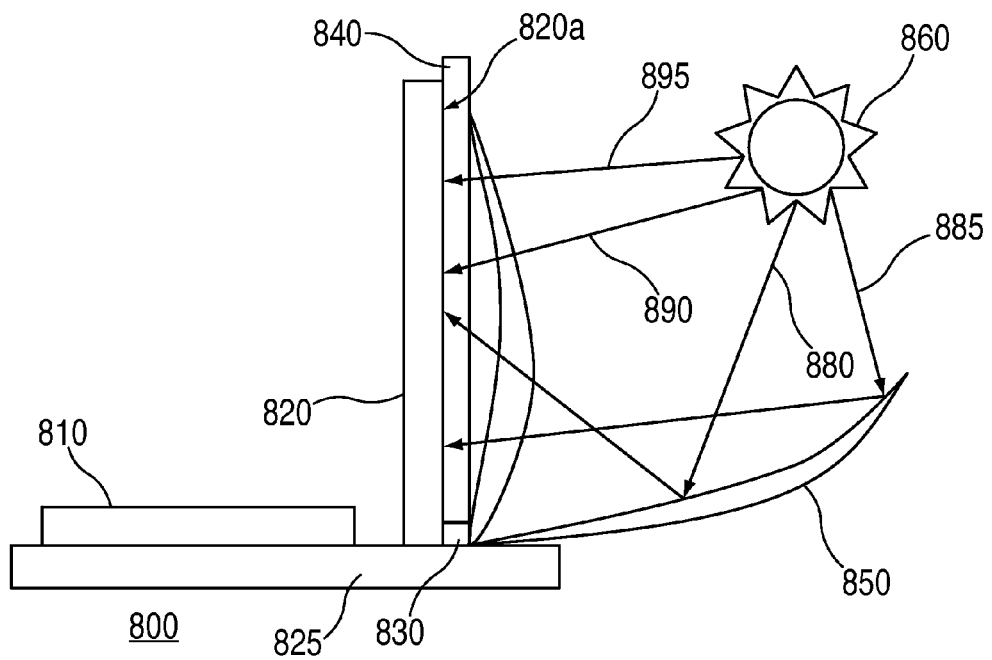
FIG. 7B shows a side view of the electronic device of FIG. 7A, but with the reflector in an open position, in accordance with some embodiments of the invention.

FIGS. 7A and 7B show a side view of an electronic device 800, which may be similar to device 700 of FIGS. 6A and 6B, but with a translucent surface repositioned with respect to a reflector in accordance with some embodiments of the invention. Electronic device 800 may include keyboard 810, display screen 820, and circuit board 825, all of which may be the same as, and may include some or all of the features of, electronic device 500, keyboard 510, display screen 520, and circuit board 525, respectively, of FIGS. 5A-5D. A translucent surface 840 may be removably positioned between display screen 820 and a reflector 850. Translucent surface 840 may be positioned adjacent one or more internal light sources or light harness 830. Reflector 850 may be detachable from device 800 or otherwise repositionable with respect to screen 820 (e.g., using a hinge assembly) as described above with respect to FIGS. 5A-5D. Reflector 850 may be detached from device 800 or may pivot about a hinge to rotate away from display screen 820 to expose translucent surface 840 to an ambient light source that may pass rays of light to display screen 820 as well as to permit reflector 850 to collect and reflect additional ambient light rays toward display screen 820.

FIG. 7B shows a side view of electronic device 800, but with reflector 850 in an open position, in accordance with some embodiments of the invention. Reflector 850 may rotate away from display screen 820 to the open position of FIG. 7B to collect ambient light from an ambient light source 860 or may rotate toward display screen 820 to the closed position of FIG. 7A to reflect light emitted by an array of internal light sources and/or light harness 830. For example, a user of electronic device 800 may take electronic device 800 outdoors into sunlight. An array of internal light sources and/or light harness 830 may not emit sufficient light to illuminate display screen 820 in the sunlit environment such that the user may use electronic device 800. Therefore, the user may reposition reflector 850 away from display screen 820, such as by pressing a button, detaching reflector 850 magnetically or otherwise from the top of display screen 820, or using a wrist flick motion similar to that used to open a cellular telephone. Reflector 850, when repositioned into an open position, may collect ambient light, such as rays 880 and 885 from light source 860, and may reflect rays 880 and 885 toward rear face 820a of display screen 820. The ambient light may also reach rear face 820a without first contacting reflector 850, as shown with rays 890 and 895. The combination of the reflected rays 880 and 885 and the direct rays 890 and 895 reaching rear face 820a may illuminate display screen 820 sufficiently to allow a user to use electronic device 800 in the presence of ambient light source 860.

Figure 8:
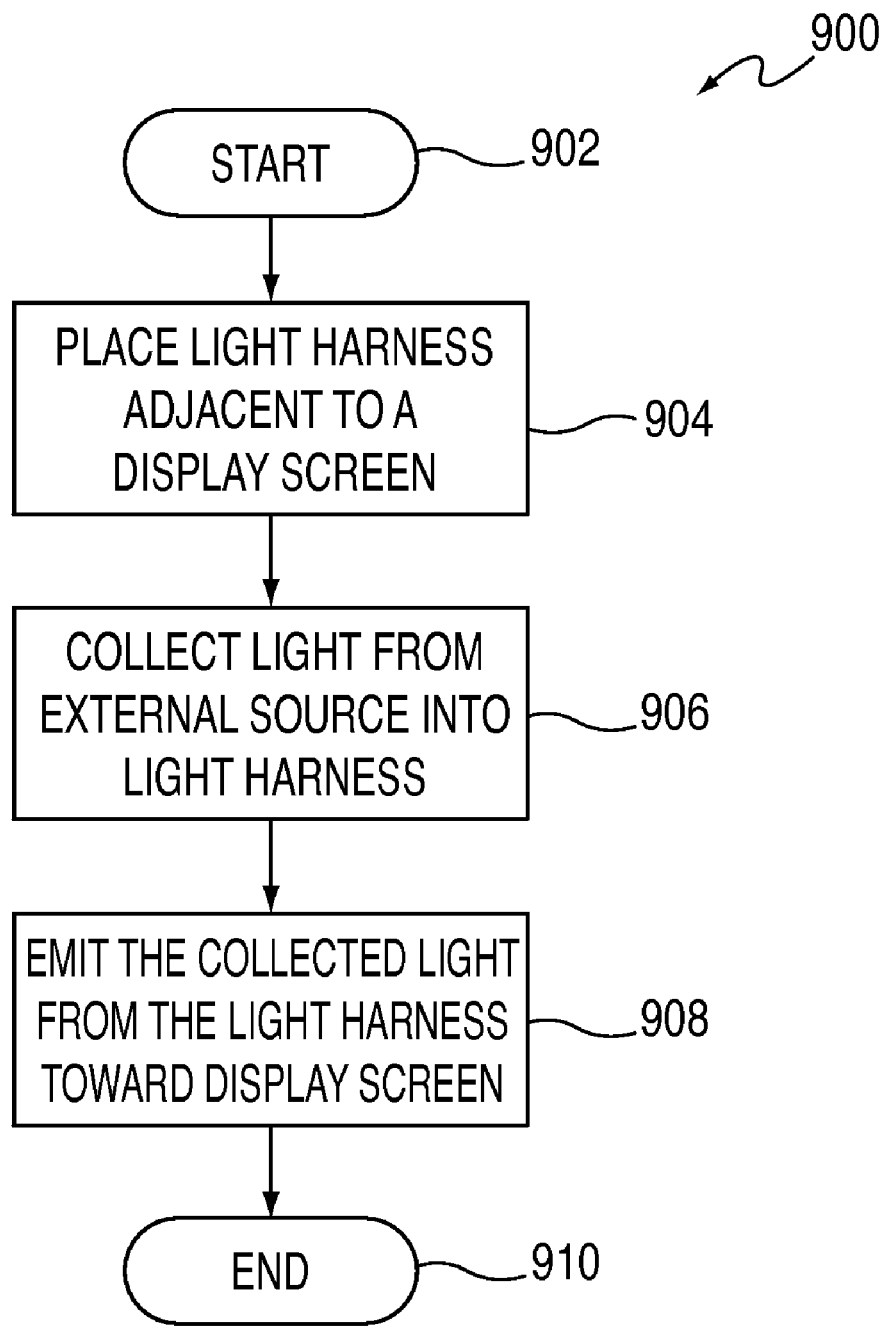
FIG. 8 is a flowchart of an illustrative process for illuminating a display screen using a light harness in accordance with some embodiments of the invention.

FIG. 8 is a flowchart of an illustrative process for illuminating a display screen using a light harness in accordance with some embodiments of the invention. Process 900 may begin at step 902. At step 904, a light harness (e.g., manifold 300 or manifold 400) may be positioned adjacent to a display screen. For example, manifold 300 may be positioned adjacent bottom edge 21 or top edge 23 of display screen 112c (FIG. 2C). At step 906, light emitted from an external light source may be channeled into the light harness. For example, a collector such as collector 370 may gather light rays from an ambient source, such as the sun, and may channel the gathered light into the light harness. Alternatively, an external light source, such as an accessory light bulb with its own power source, may be positioned adjacent to an open end of the light harness so that light from the light bulb may be channeled into the light harness. Process 900 may advance to step 908, where the collected light may be emitted from the light harness to illuminate a display screen of an electronic device. Process 900 may then advance to step 910 and end.

Figure 9:
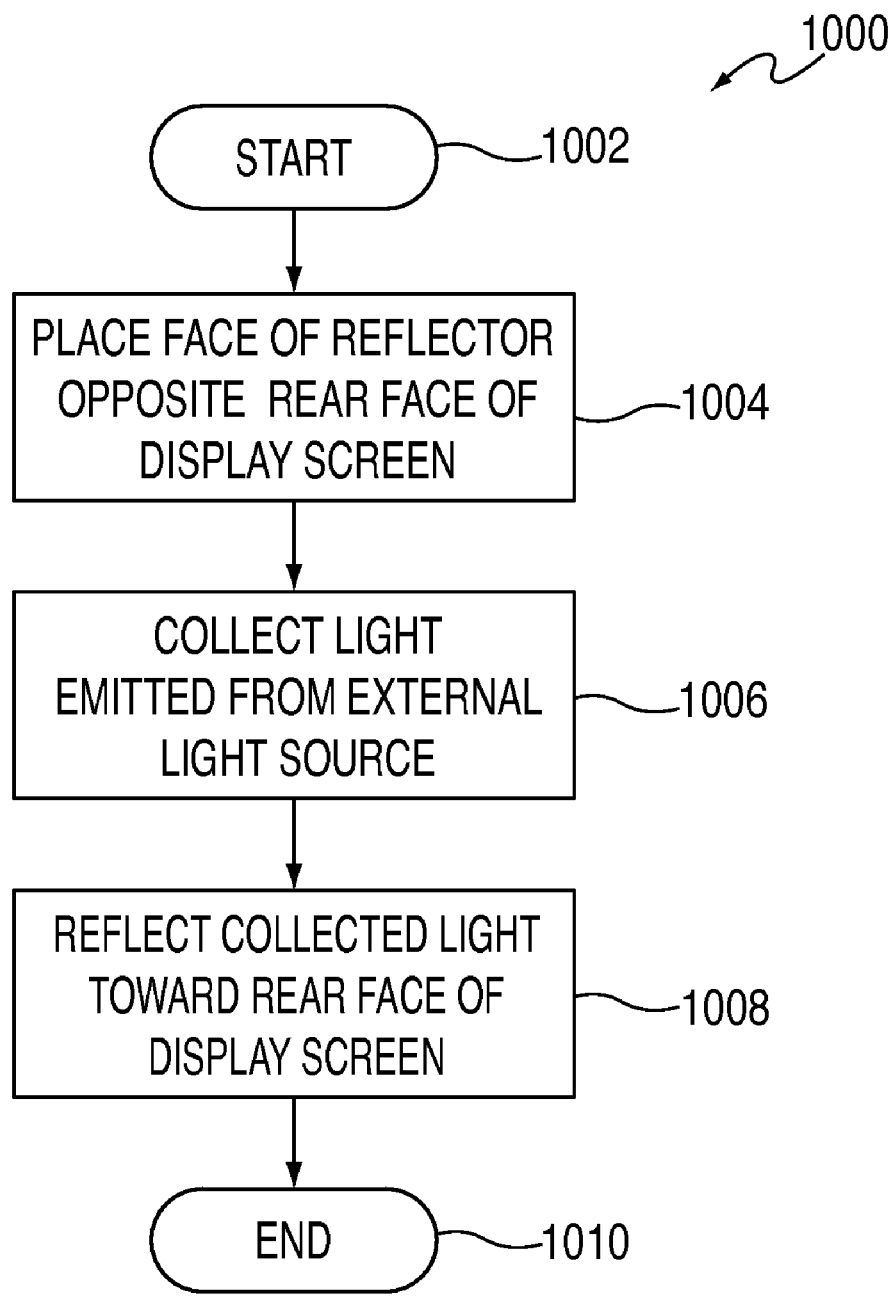
FIG. 9 is a flowchart of an illustrative process for illuminating a display screen using a reflector in accordance with some embodiments of the invention.

FIG. 9 is a flowchart of an illustrative process for illuminating a display screen using a reflector in accordance with some embodiments of the invention. Process 1000 may begin at step 1002. At step 1004, a reflector (e.g., reflector 550, reflector 750, or reflector 850) may be positioned behind a display screen such that a face of the reflector that may possess a reflective lining (e.g., face 550a, FIG. 5C) to collect and reflect light from an external light source may be facing the rear face of the display screen (e.g., face 520a, FIGS. 5C-5D). At step 1006, the reflector may be exposed to light emitted from an external light source (e.g., light source 575) and may collect at least some of the emitted light. This may be accomplished by repositioning at least a portion of the reflector with respect to the display screen, such as by rotating the reflector away from the display screen to "open" the reflector. Process 1000 may advance to step 1008, where the collected light may be reflected by the reflector toward the rear face of the display screen so as to illuminate the display screen with the reflected light. Process 1000 may then advance to step 1010 and end.

While there have been described apparatus and methods for harnessing external light to illuminate a display screen of a variety of electronic devices, it is to be understood that many changes may be made therein without departing from the spirit and scope of the invention. It will also be understood that various directional and orientational terms such as "up" and "down," "left" and "right," "top" and "bottom," "side"

and "edge" and "corner," "horizontal" and "vertical," and the like are used herein only for convenience, and that no fixed or absolute directional or orientational limitations are intended by the use of these words. For example, the positioning of a light harness, a reflector, or a translucent surface in this invention can have any desired orientation. If reoriented, different directional or orientational terms may need to be used in their description, but that will not alter their fundamental nature as within the scope of the invention. Those skilled in the art will appreciate that the invention can be practiced by other than the described embodiments, which are presented for purposes of illustration rather than of limitation, and the invention is limited only by the claims which follow.

What is claimed is:

1. An electronic device comprising:
    a display screen; and
    a light harness, wherein:
        the light harness includes a first surface extending along an edge of the display screen between a first end of the light harness and a second end of the light harness;
        the first end is configured to collect light external to the electronic device; and
        the first surface is configured to emit the collected light from the light harness for illuminating the display screen.

2. The electronic device of claim 1, wherein the light harness is cylindrical.

3. The electronic device of claim 1, further comprising a reflective material positioned along a portion of the first surface of the light harness.

4. The electronic device of claim 1, wherein the light harness is hexahedral.

5. An electronic device comprising:
    a display screen;
    a light harness, wherein:
        the light harness includes a first surface extending between a first end and a second end;
        the first end is configured to collect light external to the electronic device; and
        the first surface is configured to emit the collected light from the light harness for illuminating the display screen; and
    a reflecting cone positioned along a portion of the first surface of the light harness.

6. The electronic device of claim 1, further comprising a light collector coupled to the first end of the light harness.

7. The electronic device of claim 1, wherein the light harness is a light guide pipe.

8. An electronic device comprising:
    a display screen;
    a translucent surface;
    an internal light component; and
    a reflector having a first face operative to reflect light provided by the internal light component toward the display screen for illuminating the display screen when the reflector is in a first position between the translucent surface and the display screen, wherein the reflector is removable from the first position.

9. An electronic device comprising:
    a display screen; and
    a reflector having a first face operative to reflect light external to the electronic device toward the display screen for illuminating the display screen, wherein the reflector is configured to rotate with respect to the display screen to expose the first face to the light external to the electronic device.

10. The electronic device of claim 8, wherein a first side of the display screen is exposed to the reflector when the reflector is in the first position, and wherein the first side is translucent.

11. The electronic device of claim 8, wherein the translucent surface is a translucent protective layer configured to pass light for illuminating the display screen.

12. The electronic device of claim 11, wherein the translucent layer is removable from the electronic device.

13. An electronic device comprising:
    a display screen;
    a reflector having a first face operative to reflect light external to the electronic device toward the display screen for illuminating the display screen; and
    a translucent protective layer configured to pass light for illuminating the display screen, wherein the translucent layer is positioned between the display screen and the reflector, and wherein the reflector is configured to rotate with respect to the display screen and the translucent layer to expose the first face and the translucent layer to the light external to the electronic device.

14. A method of illuminating a display screen of an electronic device with a light harness that extends between a first end and a second end, the method comprising:
    positioning the light harness adjacent a first face of the display screen, wherein the positioning comprises positioning the first end of the light harness adjacent a first end of a first edge of the first face of the display screen and positioning the second end of the light harness adjacent a second end of the first edge of the first face of the display screen;
    collecting light external to the electronic device into the light harness via the first end of the light harness; and
    emitting the collected light from the light harness toward the first face of the display screen.

15. The method of claim 14, further comprising providing a translucent layer operative to pass the light external to the electronic device for illuminating the display screen.

16. A method of illuminating a display screen of an electronic device with a translucent surface and a reflector having a first face, the method comprising:
    positioning the first face of the reflector in a first position opposite a first side of the display screen, between the display screen and the translucent surface;
    reflecting light provided by an internal component of the device with the first face of the reflector toward the first side of the display screen when the reflector is positioned in the first position;
    removing the reflector from the first position; and
    passing light external to the electronic device through the translucent surface toward the first side of the display screen when the reflector is removed from the first position.

17. A method of illuminating a display screen of an electronic device with a reflector having a first face, the method comprising:
    positioning the first face of the reflector opposite a first side of the display screen; and
    reflecting light external to the electronic device with the first face of the reflector toward the first side of the display screen, wherein the reflector is configured to rotate with respect to the display screen to expose the first face of the reflector to the light external to the electronic device.

18. The electronic device of claim 1, wherein the light harness is configured to reflect the collected light within an interior space of the light harness defined by the first surface.

19. The electronic device of claim 18, wherein the light harness is further configured to emit the reflected light out from within the interior space through a portion of the first surface.

20. The electronic device of claim 18, wherein the light harness is further configured to emit the reflected light out from within the interior space through a portion of the first surface when the angle of reflection of the reflected light exceeds the total internal reflection of the portion of the first surface.

21. The electronic device of claim 1, wherein the light harness is configured to:
collimate the collected light within the light harness; and
emit the collimated light in a first direction out from within the light harness.

22. The electronic device of claim 21, wherein the first direction is parallel to the longitudinal axis of the light harness.

23. The electronic device of claim 21, wherein the first direction is perpendicular to the edge of the display screen.

24. The electronic device of claim 1, further comprising an internal light source positioned at the second end of the light harness.

25. The electronic device of claim 24, wherein:
the second end of the light harness is configured to receive internal light generated by the internal light source; and
the first surface is configured to emit the received internal light from the light harness for illuminating the display screen.

26. The electronic device of claim 1, further comprising an internal light source positioned within an interior space of the light harness defined by the first surface.

27. The electronic device of claim 1, wherein the first end of the light harness is an open end.

28. The electronic device of claim 27, wherein the second end of the light harness is an open end.

29. The electronic device of claim 1, wherein the light harness comprises a fiber optic cable.

30. The electronic device of claim 1, wherein the first end of the light harness is coupled to a first end of a fiber optic cable.

31. The electronic device of claim 30, wherein a light collector is coupled to a second end of the fiber optic cable.

32. The electronic device of claim 1, wherein the edge is a bottom edge of the display screen.

33. The electronic device of claim 32, further comprising a display housing, wherein the light harness is positioned between the bottom edge of the display screen and a bottom wall of the display housing.

34. The electronic device of claim 32, further comprising an internal light source positioned underneath the bottom edge of the display and adjacent to the light harness.

35. The electronic device of claim 1, further comprising a display housing, wherein the edge is a top edge of the display screen, and wherein the light harness is positioned between the top edge of the display screen and a top wall of the display housing.

36. The electronic device of claim 1, further comprising a second light harness extending along a second edge of the display screen.

37. The electronic device of claim 1, wherein the cross-sectional area of the first end of the light harness is larger than the cross-sectional area of the second end of the light harness.

38. The electronic device of claim 1, wherein the cross-sectional diameter of the first end of the light harness is 3 millimeters.

39. The electronic device of claim 1, wherein the cross-sectional diameter of the second end of the light harness is 1 millimeter.

40. The electronic device of claim 1, further comprising a reflector operative to reflect additional light external to the electronic device toward the display screen for illuminating the display screen when the reflector is in an open position with respect to the display screen.

41. The electronic device of claim 40, wherein the reflector is further operative to reflect at least a portion of the emitted light toward the display screen when the reflector is in a closed position with respect to the display screen.

42. The electronic device of claim 40, further comprising an internal light source, wherein the reflector is further operative to reflect light generated by the internal light source toward the display screen when the reflector is in a closed position with respect to the display screen.

43. The electronic device of claim 6, wherein the light collector is configured to:
capture the light external to the electronic device; and
channel to the first end of the light harness the captured light external to the electronic device.

44. The electronic device of claim 6, further comprising a housing for the display screen, wherein at least a portion of the light collector is positioned external to the housing.

45. The electronic device of claim 6, wherein the light collector is configured to automatically redirect itself toward a light source external to the electronic device.

46. The electronic device of claim 6, wherein the light collector is configured to be moved by a user with respect to the device for pointing the light collector toward a light source external to the electronic device.

47. The electronic device of claim 8, wherein, when the reflector is removed from the first position, the translucent surface passes light external to the device through the translucent surface for illuminating the display screen.

48. The electronic device of claim 8, wherein, when the reflector is removed from the first position, the translucent surface protects a rear surface of the display screen.

49. The electronic device of claim 8, wherein the reflector is removable from the electronic device.

50. The electronic device of claim 8, wherein the first face of the reflector is curved.

51. The electronic device of claim 8, wherein the internal light component is an internal light source.

52. The electronic device of claim 8, wherein the internal light component is a light harness.

53. The electronic device of claim 52, wherein:
the light harness includes a first surface extending between a first end of the light harness and a second end of the light harness;
the first end is configured to collect light external to the electronic device; and
the first surface is configured to emit the collected light from the light harness.

54. The method of claim 14, further comprising reflecting the collected light within the light harness, wherein the emitting comprises emitting the reflected collected light from the light harness toward the first face of the display screen.

55. The method of claim 14, further comprising collimating the collected light within the light harness, wherein the emitting comprises emitting the collimated collected light from the light harness toward the first face of the display screen.

56. The method of claim 16, wherein the removing comprises a user removing the reflector from the electronic device.

* * * * *